(12) United States Patent
Hoang et al.

(10) Patent No.: US 8,642,108 B2
(45) Date of Patent: Feb. 4, 2014

(54) METHOD FOR PRODUCING FATTY ACID ESTER FROM FLATTENED OLEAGINOUS GRAINS

(75) Inventors: Lê Chiên Hoang, Ruy Montceau (FR); Jean Pierre Esterez, Marsilly (FR); Julien Magne, Iteuil (FR)

(73) Assignee: Algebre, La Rochelle Cedex 1 (FR)

( * ) Notice: Subject to any disclaimer, the term of this patent is extended or adjusted under 35 U.S.C. 154(b) by 461 days.

(21) Appl. No.: 12/670,032

(22) PCT Filed: Jul. 24, 2008

(86) PCT No.: PCT/EP2008/059757
§ 371 (c)(1),
(2), (4) Date: Jun. 15, 2010

(87) PCT Pub. No.: WO2009/013349
PCT Pub. Date: Jan. 29, 2009

(65) Prior Publication Data
US 2010/0266745 A1    Oct. 21, 2010

(30) Foreign Application Priority Data
Jul. 24, 2007 (FR) .................... 07 56716

(51) Int. Cl.
*A23D 7/00* (2006.01)
*C11B 1/00* (2006.01)

(52) U.S. Cl.
USPC .............................. 426/601; 554/9

(58) Field of Classification Search
None
See application file for complete search history.

(56) References Cited

U.S. PATENT DOCUMENTS

| | | | |
|---|---|---|---|
| 6,388,110 B1 * | 5/2002 | Ulrich et al. ................. 554/13 |
| 2003/0229237 A1 * | 12/2003 | Haas et al. ................... 554/174 |
| 2005/0011112 A1 * | 1/2005 | Khalil et al. .................. 44/401 |
| 2006/0155138 A1 | 7/2006 | Haas et al. |

FOREIGN PATENT DOCUMENTS

EP    1 215 275 A1    6/2002

OTHER PUBLICATIONS

Baileys Industrial Oil and Fat Products Sixth Edition Edited by Fereidoon Shahidi, vol. 2 Edible Oil and Fat Products : Edible Oils Wiley-Interscience 2005 pp. 77-78.*
Baileys Industrial Oil and Fat Products Sixth Edition Edited by Feridoon Shahidi, vol. 5 Edible Oil and Fat Products : Processing Technologies p. 66.*
International Search Report issued in application No. PCT/EP2008/059757 on Nov. 7, 2008.
Harrington et al., "A comparison of Conventional and in situ Methods of Transesterification of Seed Oil from a Series of Sunflower Cultivars," *JAOCS*, vol. 62, No. 2, pp. 1009-1013. ( 1985 ).
Lago et al., "Extraction and transesterification of vegetable oils with ethanol," *Olégineux*, vol. 40, No. 3, pp. 147-154, Mar. 1985.
Haas et al., "In situ Alkaline Transestrification: An Effective Method for the Production of Fatty Acid Esters from Vegetable Oils," *JAOCS*, vol. 81, No. 1, pp. 83-89, 2004.
Haas et al., "Moisture Removal Substantially Improves the Efficiency of in Situ Biodiesel Production from Soybeans," *J. Amer. Oil Chem. Soc.*, vol. 84, pp. 197-204, 2007.

* cited by examiner

*Primary Examiner* — Humera Sheikh
*Assistant Examiner* — Subbalakshmi Prakash
(74) *Attorney, Agent, or Firm* — Foley & Lardner LLP

(57) ABSTRACT

The invention relates to a method for preparing fatty acid esters particularly used as bio-diesel fuel from whole oleaginous grains, characterized in that it comprises the following successive steps: preheating the whole non-husked grains; flattening the oleaginous grains; drying the flattened grains in order to obtain a water content and a volatile material content between 0.5 and 2.5%, and preferably between 1.5% and 2%; performing a transesterification by contacting the dried, flattened grains with an alcoholic medium in the presence of a catalyst; separating the liquid and solid phases resulting from the transesterification; neutralising the liquid phase from step d); and removing the alcohol and separating the glycerine from the fatty acid esters.

24 Claims, No Drawings

METHOD FOR PRODUCING FATTY ACID ESTER FROM FLATTENED OLEAGINOUS GRAINS

This application claims the priority of the French application FR0756716 which is incorporated herein in its entirety.

The present invention concerns a novel method for preparing fatty acid esters which can notably be used as biodiesel, prepared from oilseeds.

Biodiesel is a fuel obtained from vegetable oil or animal fat that is converted using a chemical process called transesterification, in order to obtain Vegetable Oil Methyl Esters (VOMEs) when using methanol or Vegetable Oil Ethyl Esters (VOEEs) when using ethanol. Biodiesel competes with vegetable oils used in the crude state and with petrodiesel i.e. conventional fossil diesel. Biodiesel can be used alone in engines or mixed with petrodiesel.

In prior art methods to obtain VOME's or VOEEs, either the crushed seeds are subjected directly to the transesterification reaction, or the oil is first extracted from the seeds, this oil is semi-refined and then the transesterification step is conducted on the neutral semi-refined oil. However, these prior art methods are not completely satisfactory. In the first case, at industrial level, the seeds must be finely crushed to obtain the best yield possible, but the phase separation step is all the more difficult the finer the crushing. In the second case, extraction of the oil and prior treatment make industrial application of the process complex and costly.

Other preparation methods have been described more recently, notably by Khalil et al (US2005/0011112) and Haas et al (US2006/0155138). These techniques, instead of seeds, use "flakes" obtained from hulled seeds. These flakes are abundantly manufactured in the agricultural industry but their use for the manufacture of biodiesel has several drawbacks: first the flakes are more fragile than the whole seeds, which leads to the formation of fine matter which has to be filtered so that the oil can be used as biodiesel; secondly the VOME and VOEE yields are not as high owing to the absence of the seed shells; finally the formation of these flakes requires costly packaging units.

The subject-matter of the present invention is a method to prepare fatty acid esters from oilseeds with excellent yield and which, at the same time, overcomes the disadvantages of the processes described in the prior art.

The first subject of the present invention is a method to prepare fatty acid esters which can be used as biodiesel, prepared from whole oilseeds, characterized in that it comprises the following successive steps:
  a. Preheating the whole non-hulled seeds;
  b. Flattening the oilseeds with their husks;
  c. Drying the flattened seeds so as to obtain a water and volatile matter content of between 0.5 and 2.5%, preferably between 1.5% and 2%;
  d. Transesterification by contacting the flattened, dried seeds with an alcohol medium in the presence of a catalyst;
  e. Separating the liquid and solid phases resulting from transesterification;
  f. Neutralizing the liquid phase derived from step e); and
  g. Removing the alcohol and separating the glycerine from the fatty acid esters.

By <<oilseeds>> is meant any plant seeds containing fat, preferably rich in triglycerides. Therefore germ, pips, kernels, and nuts also come under this category. The oilseeds also contain proteins, fibres and minerals.

The seeds are preferably chosen from among plant seeds which can be cultivated. For example use may be of rapeseed, jatropha seed, groundnut, castor bean, sesame seed, sunflower seed, safflower seed, soybean, lupin seed, camelina seed, cotton seed. The preferred seeds are rapeseed, sunflower seed and jatropha seed. Further preferably the seeds are rapeseeds.

Additionally, it is also possible to use seeds chosen from among rapeseed, groundnut, castor bean, sesame, sunflower, safflower, soy, lupin, camelina, cotton.

In the method subject of the present invention, the seeds can be used with all or a large part of their husk. In the meaning of the present invention <<oilseeds>> designates the whole seed or the seed rid of part of its husk. For example, with regard to rapeseed, sunflower seed and jatropha seed, the seed is preferably used essentially whole i.e. with at last 80% of its husk. This forms an advantageous fibrous support which can avoid disintegration of the flattened seed when contacted with the alcohol medium during the transesterification step d).

However, if the husk is too voluminous compared with the fruit (for example macadamia nut, Brazil nut, andiroba nut, coconut, shea nut or cupuacu nut) it is preferable to rid the seed of part of its husk so as not to perturb the transesterification reaction. It may also be advantageous to conduct prior crushing of the seeds if they are of large size (e.g. for the macadamia, Brazil, andiroba nuts, coconut, shea or cupuacu nut).

According to step b) of the method subject of the present invention, the oilseeds are flattened. They are then generally in the form of a thin elongate sheet, flake or chip.

Before the flattening step, the seeds are preferably cleaned i.e. rid of their solid impurities such as stones, rags, sticks, metal particles, dust.

The thickness of the flattened seeds is preferably between 10 µm and 1 mm. According to one particularly preferred embodiment, the thickness of the flattened seeds lies between 0.1 and 0.3 mm, and further preferably the thickness of the flattened seeds is less than 0.2 mm notably for rapeseed.

Also, the size of the flattened seeds i.e. their length or width is preferably between 3 and 5 mm, notably for rapeseeds and other seeds of similar size, in which it is around 4 mm.

According to one particular embodiment the oilseeds can be preheated at a temperature of between 40° C. and 60° C., preferably 50° C. before carrying out the flattening step b) so as to increase their plasticity. However, the seeds are brought to this temperature just the time that is necessary to reach the desired plasticity. It is effectively preferable to avoid drying the seeds which causes their fractioning during the flattening. The seeds must not under any circumstance be baked or dried before they are flattened.

For this purpose, the oilseeds can preferably be heated at a temperature of between 50 and 55° C. for 5 to 60 min, preferably 30 minutes, before conducting the flattening step b), optionally under water vapour.

According to the present invention, flattening of the oil seeds is advantageously achieved using rollers which may be of any type, in particular smooth or fluted, preferably smooth. Their diameter may measure up to 80 cm. The distance between the rollers is preferably less than 0.2 mm, further preferably less than 0.1 mm.

The speed of the rollers is determined so as to avoid fractioning the seeds when they are being flattened. Preferably the diameter and speed of the rollers are identical to avoid phenomena of avulsion and hence fractioning of the seeds.

According to one particular embodiment, flattening of the oilseeds is achieved using smooth rollers preferably in a single pass.

The flattening step b) is an essential step in the method, since it allows a significantly higher yield to be obtained than without any flattening, i.e. a better transesterification yield and a better extraction yield of ethyl esters.

After the flattening step, the seeds must be dried as quickly as possible to stop enzymatic activity and thereby avoid degradation of their content matter. The drying step c) is therefore conducted immediately after the flattening step b) and no later than 24 hours after the flattening step b), preferably less than 2 hours after the flattening step b) and at best within one hour after flattening. Also, by means of the drying step, it is possible to store the flattened seeds before subjecting them to the transesterification step d). Drying of the flattened seeds is performed so as to obtain a water and volatile matter content of between 0.5 and 2.5%, preferably between 1.5% and 2%.

The water and volatile matter content of the dried seeds is assayed using the method NF V 03-909.

According to one particular embodiment, the drying step c) is performed at a temperature of between 50 and 100° C., preferably between 70° and 90° C.

After the drying step c), a transesterification step is conducted by contacting the flattened, dried seeds with an alcohol medium in the presence of a catalyst. The catalyst may be basic or acid, preferably basic.

The alcohol medium may comprise one or more alcohols chosen from among the C1-C6 alcohols such as methanol or ethanol, optionally in a mixture with one or more aliphatic hydrocarbons such as hexane. The alcohol medium is preferably ethanol containing a quantity of water of less than 5000 ppm, preferably 3000 ppm.

The basic catalyst is preferably anhydrous and homogeneous and can be chosen from among sodium hydroxide, potash, sodium or potassium carbonate or hydrogen carbonate, sodium or potassium carbonate, sodium or potassium methylate or ethanolate.

The acid catalyst may be sulphuric acid for example.

Before starting the transesterification step, it may be advantageous, under a discontinuous schedule, to place the flattened seeds previously in contact with the alcohol medium, so as to impregnate them with this alcohol medium and promote subsequent transesterification. Pre-impregnation can be conducted for a time of between 10 and 30 min., preferably 30 minutes, at a temperature of between 40 and 80° C., preferably 75° C. This step is to be omitted if the reaction takes place under a continuous schedule.

To optimize the yield of the transesterification reaction, the weight ratio of catalyst/flattened seeds is preferably between 0.5/100 and 2/100 and/or the weight ratio of alcohol/flattened seeds is preferably between 100/100 and 500/100.

If the method is conducted in discontinuous mode, the transesterification reaction is advantageously conducted at a temperature of between 45 and 55° C., preferably at around 50° C., for a time of 10 min to 2 hours, preferably between 20 and 40 min.

According to one particular embodiment, the contacting of the flattened seeds with the alcohol medium at the transesterification step d) is conducted under slow stirring or by sprinkling and percolation. It is preferably conducted by percolation of the alcohol medium containing the catalyst through the flattened seeds. In practice, percolation can be conducted by sprinkling a bed of flattened seeds, having a height of preferably around 80 cm.

After the transesterification step, the liquid and solid phases resulting from said transesterification are separated, preferably by draining. The liquid phase collected is high in fatty acid esters produced by the transesterification reaction.

It is preferably for the residual content of fat in the solid phase i.e. cake to be less than 1% by weight of the total dry matter.

To collect the remainder of the fatty acid esters present in the solid phase, it is possible to conduct the following additional steps:

h) alcohol extraction of said solid phase derived from step d);
i) collection of the solid phase;
j) filtration and grouping together of the liquid phases derived from the transesterification step e) and extraction step h).

The grouped liquid phases derived from step e) can be filtered, for example through a cloth having a pore size of between 10 to 50 μm, to remove all the fine particles.

The extraction step h) is preferably conducted by countercurrent percolation with ethanol, with a weight ratio of alcohol/flattened seeds of between 100/100 and 200/100.

Also, the alcohol used at extraction step h) can be chosen from among the C1-C6 alcohols such as ethanol having a water content of less than 5000 ppm, preferably less than 3000 ppm.

The liquid phase derived from transesterification step e), optionally supplemented with the liquid phase derived from extraction step h), is then neutralized either using an acid if the reaction catalyst is basic, or with a base if the reaction catalyst is acid.

The acid is preferably chosen from among sulphuric acid, hydrochloric acid, phosphoric acid, citric acid or acetic acid.

The base may be sodium hydroxide for example.

The quantity of acid added to the liquid phase is determined so that the fatty acid content of the fatty acid ethyl esters remains less than 0.25% (equivalent to an acid number<0.5 mg KOH/g).

Neutralization of the liquid phase is performed in part so as not to increase the quantity of soaps therein.

According to one particular embodiment, the neutralization acid is added in a quantity leading to a pH close to 10, notably in a quantity of less than 0.04% of the total quantity of fatty acid esters present in said liquid phase.

After the neutralization step f), the alcohol is then removed from the liquid phase and the glycerine is separated from the fatty acid esters.

The alcohol is preferably removed by evaporation at a temperature of between 50 and 100° C. under a pressure of between 200 and 1000 mbars, preferably at around 80° C. under atmospheric pressure, until a residual alcohol content of less than 1%; is obtained.

The separation of the glycerine from the fatty acid esters is preferably carried out by centrifuging at a temperature of between 60 and 80° C. It may also be carried out by static decanting. The glycerine carries with it a large part of the impurities such as the catalyst, soaps, phosphoric derivatives or sodium sulphate.

The fatty acid esters are then advantageously washed with water, preferably at around 80° C. to fully remove the impurities, and then separated from the washing water notably by decanting or centrifuging, preferably at around 80° C., then dried preferably by evaporation at a temperature of between 90 and 100° C. under a pressure in the order of 200 mbars, until a residual water content of less than 500 ppm is obtained relative to the total dry matter. The fatty acid esters thus obtained can then be packaged under nitrogen after being cooled.

A second subject of the present invention is a method to prepare oilseed cakes intended for animal feed, using the solid phase derived from step e) or i) of the method to prepare fatty acid esters such as described previously, comprising the following steps:

1) Removing the alcohol from said solid phase; and
2) Adding the glycerine obtained at step g) of said method to prepare fatty acid esters.

The solid phase resulting from step 1) can also be supplemented with the washing waters described previously in the method to prepare fatty acid esters.

The solid phase derived from step e) or i) of said method to prepare fatty acid esters contains between 50 and 65% alcohol by weight. Removal of the alcohol from this solid phase can be achieved mechanically, notably by pressing or spinning, then thermally by entraining with water vapour until a residual water content of less than 500 ppm is obtained relative to the total dry matter.

The final oilseed cake obtained at step 2) can then be packaged in powder form or extruded.

The removed alcohol can be collected then dehydrated, for re-use in the method to prepare fatty acid esters.

The present invention and its advantages are illustrated by the following examples.

The abbreviations used in the examples are explained in the following table:

| Parameters | Unit | Significance | Measurement method |
|---|---|---|---|
| RMC | weight % | Residual moisture content | Thermobalance RMC 95: determined at 95° C. RMC105: determined at 105° C. |
| AN | mg KOH/g | Acid number (measurement of free fatty acid content) | NF EN 14 104 (T60-702) |
| PN | meq O$_2$/kg | Peroxide number (measurement of peroxide-oxidized fat) | NF T 60-220 |
| SFC | % dry matter | Fat content (Soxlhet extraction with hexane) | V 03-908 |
| VMC | % | Water and Volatile Matter content (103° C.) | NF V 03-909 |
| Hexane extracted FC | % dry matter | Fat content | Same method as SFC except a single extraction |

1) Preparation of Oilseeds Before Flattening

The objective of this first series of tests is to evidence the importance of the preheating step of the non-dried seed before it is flattened.

For this purpose, whole, non-dried rapeseed was obtained from agricultural farms in plastic bags and were treated by causing the oven preheating temperature to vary between 25, 35, 50 and 75° C. (temperature T) followed by conventional flattening and drying steps (90° C. for 12 hours). The flattened, dried seeds were finally contacted with anhydrous alcohol, which is passed by percolation through the bed of seeds and is collected downstream of the fixed bed, percolation taking place at a greater or lesser rate depending on the initial pre-treatment conditions of the seeds (preheating and flattening). During these tests, the quantity extracted fat and the percolation rate were measured.

More precisely, the operating mode comprises the following steps:

(1) preheating the whole, non-dried rapeseeds in an oven thermo-regulated at variable T° C. (25, 35, 50 and 75° C.) for 60 minutes;
(2) flattening the whole, preheated seeds;
(3) the flattened seeds are placed in a fixed bed reactor thermo-regulated at 25° C.;
(4) ethanol held at 25° C. is then added to a weight ratio of alcohol/seed of 1.9/1;
(5) the ethanol passing through the seed bed is collected downstream of the fixed bed in a glass recipient. The quantity of extracted fat and percolation time are measured.

The results of these tests are grouped together in Table 1.

TABLE 1

Influence of the preheating temperature on the quantity of fat extracted from the flattened seeds and on percolation rate.

| Preheating temperature, ° C. | 25 | 35 | 50 | 75 |
|---|---|---|---|---|
| Preheating time, min. | 60 | 60 | 60 | 60 |
| % fat extracted after percolation | 32 | 31 | 31 | 30 |
| Percolation rate m3h × m$^2$ | 12.7 | 14.6 | 17.5 | 16.5 |

Alcohol impregnation temperature: 25° C., 15 minutes (alcohol/flake weight ratio = 1.9/1).

It is clearly apparent, in the light of the results in Table 1 that the best compromise between percolation rate and percentage of extracted fat is obtained at a seed preheating temperature of 50° C. As a matter of fact, at 50° C., all other conditions being equal, ethanol diffuses quicker in the flake with an oil extraction yield equivalent to that of the other seed preheating conditions. At industrial level, this allows high conversion rates to be achieved, since the extracted fat is rapidly converted into esters in the presence of a catalyst. On the basis of these results, the gain in productivity at this step, obtained by comparison with non-preheated seed (25° C.) can be estimated at +38% by calculation. Preheating of the seed at 70° C. before flattening does not bring any improvement in the productivity of the method since, for an almost equivalent extraction yield (around 30%) the percolation rate is very slightly reduced (versus preheating of the seeds at 50° C.).

At a temperature higher than 70° C. the seeds might dry before flattening, the consequence of which would be to make them harder, which would lead to the production of fine matter at the flattening step.

2) Preparation of Flattened, Dried Oilseeds

The preparation of flattened, dried seeds is a very important step in the method subject of the invention. It consists of:
flattening the seeds, to facilitate their drying, and extraction and conversion of the fats into esters,
drying the flattened seeds to remove the water from the seeds.

Three series of rapeseed were prepared and examined:
Seeds prepared according to method 1,
Seeds prepared according to method 2,
Seeds prepared according to method 3.

2.1) Flattened Rapeseeds Prepared According to Method 1

According to method 1, flattening of the rapeseeds is achieved under the following conditions:
using roller types: either smooth rollers or fluted rollers;
either on fresh seeds or on dried seeds.

When the seeds are flattened in fresh form they are dried 48 h after flattening.

The flattened seeds were characterized by measuring the following parameters:
fat content accessible by hexane extraction (Soxlhet)
RMC 105—Residual Moisture Content at 105° C.
ΔN, acid number in mg of KOH/g (NF T 60-204)
RMC (Residual Moisture Content at 105° C.) after drying at 80° C.
Bulk density, kg/L
Percolation rate, m3/h/m²

The conditions for these measurements and the operating conditions are grouped together in Tables 2a and 2b.

TABLE 2a

Influence of drying before and after flattening, and of flattening conditions

| Ref | Roll spacing (mm) | Seed quality | Roll type | Number of flutes/cm | Rotation speed of the rolls | Content of accessible[3] fat[2] | RMC 105 | AN (mg KOH/g) | RMC after drying at 80° C. (%) | Bulk density (g/L) | Percolation rate (L/h/m²)[4] |
|---|---|---|---|---|---|---|---|---|---|---|---|
| 1 | 0.05 | fresh | fluted | 8 | 525 Front 525 Back | 43.42 | 9.48 | 2.86 | 2.92 | 410 | 10264.5 |
| 1bis | 0.05 | dry[1] | fluted | 8 | 525 Front 525 Back | 38.81 | 3.42 | 0.86 | — | — | — |
| 2 | 0.05 | fresh | fluted | 6 | 525 Front 525 Back | 41.90 | 7.71 | 1.81 | 1.79 | 401 | 21239.7 |
| 3 | 0.05 | dry[1] | fluted | 6 | 525 Front 525 Back | 42.15 | 3.76 | 1.12 | 1.67 | 463 | 2495.8 1752.1 |
| 4 | 0.05 | fresh | smooth | — | 525 Front 525 Back | 40.08 | 7.67 | 3.49 | — | — | — |
| 5 | 0.05 | dry[1] | smooth | — | 525 Front 525 Back | 37.30 | 2.93 | 0.72 | — | — | — |
| 6 | 0.1 | fresh | fluted | 10 | 500 Front 500 Back | 42.26 | 7.53 | 2.10 | 1.68 | 421 | 14520.7 |

| Ref | Roll spacing (mm) | Seed quality | Roll type | Number of flutes/cm | Rotation speed of the rolls | Content of accessible[3] fat[2] | RMC 105 | AN (mg KOH/g) | RMC after drying at 80° C. (%) | Bulk density (g/L) | Percolation rate (L/h/m²)[4] |
|---|---|---|---|---|---|---|---|---|---|---|---|
| Table 2b: Influence of drying before and after flattening, and of flattening conditions ||||||||||||
| 7 | 0.1 | fresh | fluted | 10 | 530 Front 700 Back | 45.48 | 7.42 | 3.04 | 1.76 | 420 | 4016.5 |
| 8 | 0.1 | fresh | fluted | 10 | 525 Front 525 Back | 43.06 | 7.82 | 2.18 | 1.88 | 424 | 12396.7 |
| 9 | 0.1 | dry[1] | fluted | 10 | 525 Front 525 Back | 41.78 | 4.05 | 1.03 | 1.36 | 473 | 1239.7 |
| 10 | 0.1 | fresh | fluted | 8 | 500 Front 525 Back | 42.28 | 7.79 | 1.82 | 1.54 | 419 | 19198.3 |
| 11 | 0.1 | dry[1] | fluted | 8 | 525 Front 525 Back | 39.32 | 3.97 | 0.91 | — | — | — |
| 12 | 0.1 | fresh | fluted | 6 | 525 Front 525 Back | 38.65 | 7.59 | 1.71 | — | — | — |
| 13 | 0.1 | dry[1] | fluted | 6 | 525 Front 525 Back | 39.20 | 3.07 | 0.74 | — | — | — |
| 14 | 0.1 | fresh | smooth | — | 500 Front 500 Back | 31.54 | 7.51 | 2.58 | — | — | — |
| 15 | 0.1 | dry[1] | smooth | — | 500 Front 500 Back | 39.62 | 3.24 | 0.91 | — | — | — |
| Table 2c: Influence of drying before and after flattening, and of flattening conditions (cont.) ||||||||||||
| 16 | 0.1 | dry[1] | smooth | — | 525 Front 525 Back | 34.33 | 3.33 | 0.91 | — | — | — |
| 17 | 0.2 | dry[1] | fluted | 10 (65/45) | 700 rpm | 35.72 | 3.69 | 0.92 | — | — | — |
| 18 | 0.2 | dry[1] | smooth | — | 500 Front 600 Back | 41.19 | 3.32 | 0.90 | 1.98 | 535 | 3338.8 |
| 19 | 0.2 | dry[1] | smooth | — | 700 rpm | 37.02 | 3.48 | 0.88 | — | — | — |

[1]The dry seeds were dried at a temperature of between 80 and 100° C.:
[2]Total fat content of rape seeds $T_H = 47\%$ dry matter (DM)
[3]Direct extraction with hexane for 10 hours (8 + 2 h) (Soxlhet method)
[4]Characteristics of column used: L = 295 mm, $d_{int}$ = 39.3 mm, $S_c$ = 1.21.10$^{-3}$ m², Sinter size = n°0, Tap size = 4 mm, bed height = about 40 mm, Characteristics of ethanol used: Alcohol content = 96.2°, $d_{am\ b}$ = 0.807, $d_{percolation}$ = 28330.6 L/h/m²; Operating conditions: $h_{bed}$ = 4 cm T = ambient, $t_{rep\ s}$ = 10 min.

Conclusions:
  dry seeds ill withstand flattening, and percolation of ethanol is lower with these seeds on account of fines,
  drying of the seeds prevents degradation of the fats. The acid number of the fats in the dry seeds is much lower than that of fresh seeds,
  the fluted rolls cause more fines than smooth rollers,
  the desired distance between the rolls is no more than 0.1 mm.

2.2) Rape Seeds Prepared According to Method 2

Flattening is conducted under the following conditions:

| | |
|---|---|
| Flattener | DAMMAN-CROES flattener |
| Rolls | Smooth, diameter 14 cm, length 24 cm |
| Roll spacing | 0.1 mm |
| Rotation speed | 60 rpm |

The total oil content of the seed is 50%. Calculation of crushing deficiency:

$$\text{Deficiency} = \frac{50 - \text{extracted matter}}{50 + (50 - \text{extracted matter})}$$

TABLE 3

Characteristics of the rapeseeds

| | References | | | |
|---|---|---|---|---|
| | 1 | 2 | 3 | 4 |
| Roll spacing | 0.05 | 0.1 | 0.2 | 0.3 |
| Packaging | Plastic bag | Plastic bag | Plastic bag | Plastic bag |
| Storage time after flattening | 2 months | 2 months | 2 months | 2 months |
| Volatile matter content VMC % | 6.59 | 6.34 | 6.73 | 6.67 |
| Fat extracted with hexane % DM | 49.37 | 49.82 | 48.87 | 46.96 |
| Crushing deficiency, % DM | 1.24 | 0.36 | 2.21 | 5.73 |
| Acidity mg KOH/g | 3.33 | 2.98 | 2.80 | 2.30 |

Conclusions:

The flattened, non-dried seeds do not keep well. The acid number of the fat increases very significantly after 6 weeks storage (from 1 to 3.3 mg KOH/g). The finer the seeds are flattened, the greater the degradation of the fats. The content of extracted fats (with hexane) does not change with a roll spacing of 0.05 mm to 0.1 mm. It decreases on and after 0.2 mm and especially at 0.3 mm of spacing.

It is therefore absolutely necessary to dry the seeds after flattening. The roll spacing may range from 0.05 mm to 0.1 mm. Also, it appears that if the final oilseed cake is to have fat content of less than 2%, the thickness of the flattened seed must be less than 0.2 mm.

2.3) Rapeseed Prepared According to Method 3

2.3.1) Objective

The fat of the flattened moist seeds may deteriorate through enzymatic hydrolysis during storage time. Its acid number is increased. The objective of the work conducted in this section is to determine the suitable conditions for storage of the flattened rape seeds.

The rape seeds were flattened and treated immediately on site.

2.3.2) Test Protocol 2.3.2.1) Flattening

The rape seeds (6-7% water) were flattened under the following conditions without being pre-heated:

| | |
|---|---|
| Flattener | HENRY flattener |
| Power | 2HP |
| Rolls | Smooth, diameter 14 cm, length 24 cm |
| Roll spacing | 0.1 mm |
| Rotation speed | 60 rpm |
| Quantity of seeds treated per test: | 20 kg |
| Seed flow rate | 25 kg/h |

2.3.2.2.) Drying

The flattened seeds are then dried in a Turbétuve drying oven either at 80° C. or at 90° C. to obtain a residual water content between 1 and 2%. The drying conditions are:

| | |
|---|---|
| Apparatus | CERCO SEMIP Turbetuve oven type TE 75 T1 04 |
| Power | 6.35 W |
| Drying baskets | 4 quarters with perforated base |
| Quantity of flakes | 4 × 5 kg |
| Bed height | 30 cm |
| Air flow rate | Heat convection |

The dry seeds are packaged in sealed plastic bags and stored at room temperature. The quality of the seeds was monitored by measuring:
  Volatile Matter Content VMC (%)
  Content of accessible fat (% DM), yield—Soxlhet extraction with hexane for 10 h
  acid number of the extracted fat (mg KOH/g)—NFT 60-204
  peroxide number
  percolation 2.3.3.) Storage Results

TABLE 4

Influence of seed storage time on the quality of fats

| | Date | | | | | | | | |
|---|---|---|---|---|---|---|---|---|---|
| | D | D + 1 | D + 3 | D + 7 | D + 10 | D + 14 | D + 21 | D + 28 | D + 35 |
| Non-dried seeds | | | | | | | | | |
| Residual Moisture Content 95 (RMC 95), % | 6.5 | — | 6.5 | 6.5 | — | — | — | — | — |
| Accessible fats (SFC), % dry matter (DM) | 49.0 | — | 48.9 | 48.9 | — | — | — | — | — |
| Acid Number (AN), mg KOH/g | 0.8 | — | 3.5 | 17.0 | — | — | — | — | — |

TABLE 4-continued

Influence of seed storage time on the quality of fats

| | \multicolumn{9}{c}{Date} | | | | | | | | |
|---|---|---|---|---|---|---|---|---|---|
| | D | D + 1 | D + 3 | D + 7 | D + 10 | D + 14 | D + 21 | D + 28 | D + 35 |
| Seeds dried at 80° C. | | | | | | | | | |
| RMC 95, % | 1.84 | 2.01 | 1.67 | 1.74 | 1.98 | 1.73 | 2.10 | 2.31 | 2.05 |
| Accessible fat content (SFC), % DM | 48.5 | 47.8 | 47.7 | 45.8 | 46.6 | 48.4 | 47.5 | 44.6 | 47.2 |
| AN, mg KOH/g | 0.89 | 0.91 | 0.77 | 0.76 | 0.77 | 0.78 | 0.90 | 0.73 | 0.88 |
| PN peroxide number meq $O_2$/kg | 1.43 | — | — | — | — | — | — | — | 1.70 |
| Seeds dried at 90° C. | | | | | | | | | |
| RMC 95, % | 1.57 | 1.69 | 1.48 | 1.87 | 1.81 | 1.76 | 1.87 | 1.88 | 1.94 |
| Accessible fat content (SFC), % DM | 48.9 | 48.2 | 49.6 | 46.5 | 45.8 | 48.6 | 48.4 | 48.1 | 48.8 |
| AN, mg KOH/g | 0.94 | 0.96 | 0.70 | 0.91 | 0.87 | 0.82 | 0.85 | 0.85 | 0.92 |
| PN meq $O_2$/kg | 0.73 | — | — | — | — | — | — | — | 0.80 |

Water intake by the flakes is very slow during storage. The other parameters for the quality of the fats show practically no change after 35 days' storage.

The flattened, non-dried seeds see the acidity of their oil rise very rapidly: for example, after one week acidity may reach a value of 17 mg KOH/g. This acidity is equivalent to 10% of the oil hydrolyzed into free fatty acids. The free fatty acids thus fabricated will have a negative impact on the reaction in a basic medium: they will be saponified (consumption of NaOH catalyst). Therefore the ester yield will be lower the greater the extent of hydrolysis. On the other hand, the seeds dried immediately after their fabrication have an oil acidity that is stable over time.

We conclude that the flattened, dried rapeseeds may be stored at least 35 days in a sealed plastic bag.

In the light of the experiments performed, it is preferable to proceed with the preparation operations for the seeds in the following order:
   Cleaning the impurities,
   Pre-heating to increase plasticity (<60° C.), an addition of water vapour may be beneficial,
   Flattening with smooth rolls, in a single pass,
   Drying at a temperature ranging from 70 to 90° C. immediately after flattening.

3) Reaction Conditions and Treatment of the Products 3.1) Influence of Alcohol Impregnation Temperature of the Conditioned Seed The objective of this series of tests is to evidence the importance of the alcohol impregnation step of the previously flattened and dried seeds, and in particular its incidence on the extracting and reacting property of ethanol with respect to oily fat. For this purpose, we caused the temperature of alcohol impregnation to vary between 25, 50 and 75° C. (temperature T).

From an experimental viewpoint, the operating mode comprises the following key steps:
   (1) Flattening whole rapeseed with preheating at 50° C. for 60 minutes;
   (2) Drying the flattened seed at 90° C. for 12 hours (residual moisture of the flake: 20)
   (3) impregnation of the seeds in a thermo-regulated closed reactor equipped with mechanical stirring and a coolant, in the presence of anhydrous ethanol at temperature T for 15 minutes with a weight ratio of ethanol/flake of 1.9/1. At this point, the content of extracted fat is measured after 15 minutes. This content translates the extractive capacity of the alcohol under the test conditions and hence its subsequent reactivity in the presence of a catalyst in the transesterification reaction of the extracted oil.

In this type of <<in planta>> method, since the medium consists of a liquid phase and a solid phase, the reaction is chiefly governed by the diffusion of alcohol in the seed. Alcohol plays the twofold role of solvent for the fats and of reagent. Therefore, the more the yield of extracted fat is promoted the higher the yield of target esters. Under reaction conditions in the presence of a catalyst, the extracted fat is rapidly converted to esters. Indeed, extraction of the fats from the seeds by alcohol is an essential factor of the method. The test results are given in Table 5.

TABLE 5

Influence of alcohol impregnation temperature on conditioned seeds

| Alcohol impregnation temperature, ° C. | 25 | 50 | 75 |
|---|---|---|---|
| Impregnation time, min. | 15 | 15 | 15 |
| % extracted fat after 15 minutes | 33 | 41 | 59 |

Conditions: Flake/Alcohol impregnation ratio: 1/1.9
Flake: preheating 50° C., flattening 0.05 mm, drying 2% moisture It is clearly apparent, in the light of the results of Table 5, that the higher the alcohol impregnation temperature the higher the yield of fat extraction, hence its subsequent conversion into target esters.

This step can be used when operating in discontinuous mode to improve fat extraction and purity of the esters thus converted.

On the other hand, when operating in continuous mode, this step is not advisable since a precipitate has been observed at the head of the bed when the catalyst is added after an impregnation time of 30 min and even with an impregnation time of 5 min. This precipitate causes very rapid and very major decrease in percolation. At industrial level it cannot be contemplated to work with such low percolation rates as there is a risk of clogging the extractor.

TABLE 5bis

Influence of pre-impregnation on percolation and on conversion under continuous mode operation

| | Tests | | |
|---|---|---|---|
| | 1 | 2 | 3 |
| Impregnation time, min | 5 | 30 | 0 |
| Peroclation rate on impregnation m3/hm² | 10 | 10 | — |
| Reaction time, min. | 30 | 30 | 30 |
| Percolation rate on reaction, m3/hm² | 5 | 1 | 13 |
| Extraction yield, % | 90 | 92 | 85 |
| Ester purity, % ester | 100 | 100 | 100 |

Conditions: Flattened seed thickness 0.35 mm, dried at 80° C., Temperature 50° C. NaOH/EtOH/seed ratio: 1.5%/2/1

Pre-impregnation has a positive effect on extraction (90-92%), on the other hand percolation rates are largely reduced when the catalyst is added. The flow rate then drops from 10 to 5 even to 1 m3/hm² depending on pre-impregnation time.

The longer the pre-impregnation time, the greater the decrease in flow rate. This phenomenon can be accounted for as follows. In a neutral alcohol medium, sugars are soluble. The longer the extraction the more the quantity of soluble sugar increases. Sugars are no longer soluble in a basic medium on account of an aldol condensation reaction. A precipitate is then formed which concentrates at the head of the bed, and it is this precipitate which perturbs percolation.

Under discontinuous mode this reaction is also possible, with the difference that the precipitate thus formed is diluted in the entirety of the seeds and therefore has little impact on filtering.

3.2.) Reaction with EtONa as Catalyst

The objective of this series of tests is to validate the conditioning of the flattened, dried seeds before the reaction. We used EtONa as catalyst. The seeds were prepared according to method 2 described above:
  drying at 60° C.,
  flattening with two roll distances
  storage in anhydrous ethanol
  We reviewed the main operations of the method

TABLE 6

Influence of roll spacing

| | References | |
|---|---|---|
| | ET7 | ET8 |
| Pre-impregnation | 24 h at T$_{ambient}$ | 72 h at T$_{ambient}$ |
| Reaction | | |
| T° C. | 50 | 50 |
| Time, h | 2 | 2 |
| Ethanol, g | 1400 | 1400 |
| Water content ppm | 450 | 450 |
| Catalyst | | |
| 99% EtONa, g | 23.7 | 23.7 |
| Ethanol, g | 89.3 | 89.3 |
| Flattened rapeseed, g | 1000 | 1000 |
| Roll spacing, mm | 0.05 | 0.10 |
| Water, % | 2.12 | 2.12 |
| SFC Fat content[1], % DM | 46.1 | 46.1 |
| AN of the fat, mg of KOH/g | 0.9 | 0.9 |
| Seed preparation method | Method 2 Flattener: DAMMAN-CROES Roll type: | Method 2 Flattener: DAMMAN-CROES Roll type: |
| Seeds dried with cooperative dryer | | |

TABLE 6-continued

Influence of roll spacing

| | References | |
|---|---|---|
| | ET7 | ET8 |
| at 90-100° C. before flattening | Smooth Spacing: 0.05 mm T 2$^{nd}$ drying: 60° C. Drying time: 1 h | Smooth Spacing: 0.10 mm T 2$^{nd}$ drying: 60° C. Drying time: 1 h |
| Ethanol/flake, m/m | 1.5 | 1.5 |
| Treatment after baking | Filtering under nitrogen at 0.5 bar. 3 extractions of the cake with absolute ethanol. (Ethanol/Solid = 1/1) | Filtering under nitrogen at 0.5 bar. 3 extractions of the cake with absolute ethanol. (Ethanol/Solid = 1/1) |
| Fat content in end cake after reaction, % DM: among which: | 4.1 | 8.1 |
| Ethyl esters (EE) % | 55.3 | 25.4 |
| Monoglycerides (MG) % | 0.33 | 0.9 |
| Diglycerides (DG) % | 1.86 | 1.9 |
| Triglycerides (TG) % | 42.07 | 70.8 |
| Treatment of liquid phase | Evaporation of ethanol 80° C., max. vacuum 100 mbars (R5) Decanting (15 min at 80° C.) 4 washings of esters (80° C.) Drying (90° C., 20 mbars, 30 min) | Evaporation of ethanol 80° C., max. vacuum 100 mbars (R5) Decanting (15 min at 80° C.) 4 washings of esters (80° C.) Drying (90° C., 20 mbars, 30 min) |
| Crude glycerine, g | 74 | 68.2 |
| Final esters, g | 424 | 392 |
| Ethyl esters (EE) % | 98.8 | 98.0 |
| Monoglycerides (MG) % | 0.47 | 0.78 |
| Diglycerides (DG) % | 0.2 | 0.31 |
| Triglycerides (TG) % | 0 | 0 |

[1]Determined as per standard V03-908

The final esters represent around 40% of the starting seeds. They have very high purity.

A roll spacing of 0.05 mm allows a greater quantity of esters to be produced than a distance of 0.1 mm. The yield of the transesterification reaction is therefore better with a roll spacing of 0.05 mm than with a spacing of 0.1 mm.

3.3) Optimisation of Reaction Conditions with NaOH as Catalyst

As catalyst EtONa gives better performance than sodium hydroxide (NaOH). On the other hand, sodium hydroxide is much less costly than EtONa. The objective of this series of tests is therefore to define optimal reaction conditions using NaOH as catalyst (lowest consumption of catalyst and ethanol) for conversion of the triglycerides into ethyl esters.

The chief parameters examined are:
  weight ratio <<Catalyst/Seed>> and effect of pre-impregnation,
  weight ratio <<Ethanol/Seed>>,
  water content of the ethanol,
  thickness of flakes.

Operating Mode:

The reaction was carried out in a double-jacketed reactor with gentle stirring. The operating mode is as follows:
  adding all the ethanol to the reactor at ambient temperature under nitrogen, adding all the catalyst to the reactor under moderate stirring, raising the temperature of the reactor to 50° C., after 30 min, adding all the flattened seeds to the reactor under moderate stirring and maintaining the temperature at 50° C., taking a sample of the reaction mixture and filtering it to obtain a liquid phase (L0) and a solid phase (S0), conducting L0 extraction with hexane (liquid-liquid), washing, drying and analysing the fat obtained using HPLC, conducting S0 extraction with hexane (10 h in Soxlhet); drying the low fat cake in a crystallizing dish under a hood; washing, drying and analyzing the fat obtained using HPLC.

3.3.1) Influence of the Weight Ratio <<Catalyst/Seed>> and of Pre-Impregnation on the Reaction Under Discontinuous Operating Mode.

Table 7a: Influence of the <<Catalyst/Seed>> ratio and of pre-impregnation on triglyceride conversion in discontinuous mode

| Parameters | F1bis | F2 | F3 | F4 | F5 | F6 |
|---|---|---|---|---|---|---|
| Pre-impregnation | No | No | No | Yes | Yes | Yes |
| T, ° C. | | | | 50 | 50 | 50 |
| Time, min. | | | | 30 | 30 | 30 |
| Reaction | | | | | | |
| T, ° C. | 50 | 50 | 50 | 50 | 50 | 50 |
| Time, h | 2 to 4 | 2 to 4 | 2 to 4 | 2 to 4 | 2 to 4 | 2 to 4 |
| Ethanol, g | 1500 | 1500 | 1500 | 1350 | 1350 | 1350 |
| Water content ppm | 465 | 434 | 361 | 361 | 402 | 402 |
| Catalyst | | | | | | |
| 99% NaOH, g | 15 | 17.5 | 17.5 | 17.5 | 17.5 | 17.5 |
| Ethanol, g | 0 | 0 | 0 | 150 | 150 | 150 |
| Colza flake, g | 1000 | 1000 | 1000 | 1000 | 1000 | 1000 |
| Drying temp, ° C. | 90 | 90 | 60 | 60 | 80 | 60 |
| Water, % | 1.78 | 1.78 | 1.87 | 0.96 | 0.96 | 0.96 |
| Fat content[1], % DM | 48.9 | 48.9 | 48.9 | 48.9 | 48.9 | 48.9 |
| AN of fat, mg KOH/g | 0.9 | 0.9 | 0.9 | 0.9 | 0.9 | 0.9 |
| Seed preparation method | Method 3 Flattener: HENRY Roll type: Smooth Spacing: 0.1 mm Drying T: 90° C. Drying time: 4 h | Method 3 Flattener: HENRY Roll type: Smooth Spacing: 0.1 mm Drying T: 90° C. Drying time: 4 h | Method 3 Flattener: HENRY Roll type: Smooth Spacing: 0.05 mm Drying T: 60° C. Drying time: 8 h 30 | Method 3 Flattener: HENRY Roll type: Smooth Spacing: 0.05 mm Drying T: 60° C. Drying time: 8 h 30 | Method 3 Flattener: HENRY Roll type: Smooth Spacing: 0.05 mm Drying T: 80° C. Drying time: 5 h 15 | Method 3 Flattener: HENRY Roll type: Smooth Spacing: 0.05 mm Drying T: 60° C. Drying time: 8 h 30 |
| Fat concentration[1] after L0 reaction, % (m/m) | | | | | | |
| 2 h | — | 16.2 | 20.0 | 22.6 | 23.0 | 23.8 |
| 4 h | 16.5 | 19.3 | 17.7 | 22.7 | 23.6 | 24.5 |
| L0 triglycerides (% fat) | | | | | | |
| 2 h | | 0 | 0 | 0 | 0 | 0 |
| 4 h | | 0.84 | 0.61 | 0 | 0 | 0 |
| S0 triglycerides (% fat) | | | | | | |
| 2 h | | 19.1 | 12.59 | 6.16 | 4.31 | 3.38 |
| 4 h | 24.76 | 33.74 | — | 1.85 | 1.40 | 3.26 |

| | | | |
|---|---|---|---|
| Theoretical Triglyceride/ ester, % | | | |
| 2 h | 2.25 | 1.78 | 1.35 |
| 4 h | 0.80 | 0.62 | 1.32 |

Table 7b: Influence of the <<Catalyst/Seed>> ratio and of pre-impregnation on triglyceride conversion in discontinuous mode (cont.)

| Parameters | F7 | F8 | F9 |
|---|---|---|---|
| Pre-impregnation | Yes | Yes | Yes |
| T, ° C. | 50 | 50 | 50 |
| Time, min. | 30 | 30 | 30 |
| Reaction | | | |
| T, ° C. | 50 | 60 | 60 |
| Time, h | 2 to 4 | 2 to 4 | 2 to 4 |
| Ethanol, g | 1350 | 1350 | 1350 |
| Water content, ppm | 440 | 400-450 | 400-450 |
| Catalyst | | | |
| 99% NaOH, g | 17.5 | 17.5 | 17.5 |
| Ethanol, g | 150 | 150 | 150 |
| Rapeseed flake, g | 1000 | 1000 | 1000 |
| Water, % | 0.91 | 0.91 | 4.46 |
| Fat content[1] % DM | 48.9 | 48.9 | 48.9 |
| AN of fat, mg KOH/g | 0.9 | 0.9 | 0.9 |
| Seed preparation method | Method 3 Flattener: HENRY Roll type: smooth Spacing: 0.05 mm Drying T: 80° C. Drying time: 5 h 15 | Method 3 Flattener: HENRY Roll type: smooth Spacing: 0.05 mm Drying T: 80° C. Drying time: 5 h 15 | Method 1 Flattener: STOLZ Roll type: smooth Spacing: 0.1 mm Drying T: 80° C. Drying time: 5 h 15 |
| Fat concentration[1] after L0 reaction, % (m/m) | | | |
| 2 h | 23.0 | 20.7 | 19.0 |
| 4 h | 2.9 | 23.3 | 19.0 |
| L0 Triglycerides (% fat) | | | |
| 2 h | 0 | 0 | 0.2 |
| 4 h | 0 | 0 | 0.2 |
| S0 Triglycerides (% fat) | | | |
| 2 h | 4.63 | 6.1 | 12.66 |
| 4 h | 3.54 | 3.95 | 9.54 |
| Triglyceride/Ester theoretical % | | | |
| 2 h | 2.25 | 2.95 | 4.6 |
| 4 h | 1.48 | 1.65 | 3.51 |

[1]Determined as per standard V03-908.

Under discontinuous mode, pre-impregnation is preferable for good fat extraction and conversion. The impregnation time of 30 min can be reduced to increase the productivity of the installation. Under discontinuous mode, the <<Catalyst/ethanol/seed>> ratio can be set at <<17.5 g/1500 g/1000 g>>.

We note that the quality of the flattened seeds has a major influence on fat extraction. The test conditions F4, F5, F6 are the best.

3.3.2) Influence of the <<Ethanol/Seed>> Weight Ratio in Discontinuous Mode

Table 8a: Influence of the <<Ethanol/Seed>> weight ratio

| Parameters | F10 | F11 | F12 | F13 |
|---|---|---|---|---|
| Pre-impregnation | Yes | Yes | Yes | Yes |

-continued

| | | | | |
|---|---|---|---|---|
| Reaction | | | | |
| T° C. | 50 | 50 | 50 | 50 |
| Time, h | 2 to 4 | 2 to 4 | 2 to 4 | 2 to 4 |
| Ethanol, g | 1350 | 1350 | 1350 | 1350 |
| Water content ppm | 441 | 418 | 443 | 451 |
| Catalyst | | | | |
| 99% NaOH, g | 17.5 | 17.5 | 17.5 | 17.5 |
| Ethanol, g | 150 | 150 | 100 | 150 |
| Rapeseed flake g | 1000 | 1000 | 1000 | 1000 |
| Water, % | 1.77 | 1.64 | 1.95 | 1.23 |
| Fat content[1] % DM | 48.9 | 48.9 | 48.9 | 48.9 |
| AN of fat mg KOH/h | 0.9 | 0.9 | 0.9 | 0.9 |
| Seed preparation method | Method 3 Flattener: HENRY Roll type: smooth Spacing: 0.1 mm Drying T: 80° C. Drying time: 5 h 15 | Method 3 Flattener: HENRY Roll type: smooth Spacing: 0.15 mm Drying T: 80° C. Drying time: 5 h 15 | Method 3 Flattener: HENRY Roll type: smooth Spacing: 0.05 mm Drying T: 80° C. Drying time: 5 h 15 | Method 3b (two flattenings) Flattener: HENRY Roll type: smooth Spacing: 1st flattening: 0.5 mm 2nd flattening: 0.05 mm DryingT: 80° C. Drying time: 5 h 15 |
| Ethanol/Rapeseed flakes | 1.5 | 1.5 | 1.5 | 1.5 |
| Fat concentration[1] after L0 reaction, % (m/m) | | | | |
| 2 h | 17 | 15.2 | 18.4 | 21.5 |
| 4 h | 19 | 18.1 | 20.4 | 25.1 |
| L0 Triglycerides, % fat | | | | |
| 2 h | 0 | 0 | 0 | 0 |
| 4 h | 0.04 | 0.06 | 0.08 | 0 |
| S0 Triglycerides % fat | | | | |
| 2 h | 36.17 | 65.1 | 33.8 | 1.1 |
| 4 h | 25.2 | 65.0 | 21.9 | 0.8 |
| Theort.TG/Ester | | | | |
| 2 h | 13.5 | 30.0 | 14.7 | 0.42 |
| 4 h | 6.5 | 28.4 | 8.18 | 0.28 |

Table 8b: Influence of the <<Ethanol/Seed>> weight ratio in discontinuous mode (cont.)

| Parameters | F14 | F15 | F16 | F17 | F18 | F19 |
|---|---|---|---|---|---|---|
| Pre-impregnation | Yes | Yes | Yes | Yes | Yes | Yes |
| Reaction | | | | | | |
| T, ° C. | 50 | 50 | 50 | 50 | 50 | 50 |
| Time, h | 2 to 4 | 2 to 4 | 2 to 4 | 2 to 4 | 2 to 4 | 2 to 4 |
| Ethanol, g | 1115 | 1115 | 1115 | 1115 | 1115 | 1115 |
| Water content ppm | 438 | 3397 | 3343 | 3517 | 3618 | 3516 |
| Catalyst | | | | | | |
| 99% NaOH, g | 17.5 | 17.5 | 15.2 | 15.2 | 15.2 | 15.2 |
| Ethanol, g | 150 | 150 | 150 | 150 | 150 | 150 |
| Colza flake, g | 1000 | 1000 | 1000 | 1000 | 1000 | 1000 |
| Water, % | 1.05 | 1.17 | 1.26 | | 1.17 | 1.22 |
| Fat content[1], % DM | 48.9 | 48.9 | 48.9 | 1.20 | 48.9 | 48.9 |
| AN of fat, mg KOH/g | 0.9 | 0.9 | 0.9 | | 0.9 | 0.9 |
| Seed | Method 3b | Method 3b | Method 3b | Method 3b | Method 3b | Method 3b |

-continued

| preparation method | (Two flattenings) Flattener: HENRY Roll type: Smooth Spacing: 1st flattening: 0.5 mm 2nd flattening: 0.05 mm Drying T: 80° C. Drying time: 5 h 15 | (Two flattenings) Flattener: HENRY Roll type: Smooth Spacing: 1st flattening: 0.5 mm 2nd flattening: 0.05 mm Drying T: 80° C. Drying time: 5 h 15 | (Two flattenings) Flattener: HENRY Roll type: Smooth Spacing: 1st flattening: 0.5 mm 2nd flattening: 0.05 mm Drying T: 80° C. Drying time: 5 h 15 | (Two flattenings) Flattener: HENRY Roll type: Smooth Spacing: 1st flattening: 0.5 mm 2nd flattening: 0.07 to 0.09 mm Drying T: 80° C. Drying time: 5 h 15 | (Two flattenings) Flattener: HENRY Roll type: Smooth Spacing: 1st flattening: 0.4 mm 2nd flattening: 0.04 mm Drying T: 80° C. Drying time: 5 h 15 | (Two flattenings) Flattener: HENRY Roll type: Smooth Spacing: 1st flattening: 0.5 mm 2nd flattening: 0.04 mm Drying T: 80° C. Drying time: 5 h 15 |
|---|---|---|---|---|---|---|
| Ethanol/ rapeseed flakes | 1.3 | 1.3 | 1.3 | 1.3 | 1.3 | 1.3 |
| Fat concentration[1] after L0 reaction, (m/m) | | | | | | |
| 2 h | 26.7 | 27.4 | 27.8 | 20.0 | 26.5 | 26.5 |
| 4 h | 27.3 | 27.2 | 27.3 | — | 28.5 | 27.4 |
| L0 triglycerides % fat | | | | | | |
| 2 h | 0 | 0 | 0.1 | 0.04 | 0.2 | 0.1 |
| 4 h | 0 | 0 | 0 | — | 0.2 | 0 |
| S0 triglycerides % fat | | | | | | |
| 2 h | 2.0 | 1.0 | 2.04 | 46.8 | 4.92 | 4.09 |
| 4 h | 0.9 | 1.1 | 1.22 | — | 3.55 | 3.31 |
| Theoretical TG/Ester | | | | | | |
| 2 h | 0.83 | 0.37 | 0.85 | 21.6 | 2.32 | 2.00 |
| 4 h | 0.37 | 0.46 | 0.51 | — | 1.39 | 1.61 |

[1]Determined as per standard V03-908

The <<Ethanol/Seeds>> ratio may lie between 1.3/1 under the stirred, discontinuous schedule of the reaction. For a continuous schedule and a fixed bed, this ratio must be adjusted.

3.3.3) Influence of Water Content in the Ethanol

TABLE 9

Influence of water content in the ethanol

| Parameters | F14 | F15 |
|---|---|---|
| Date | 27 Feb 06 | 28 Feb 06 |
| Pre-impregnation Reaction | YES | YES |
| Temperature ° C. | 50 | 50 |
| Time, h | 2 to 4 | 2 to 4 |
| Ethanol, g | 1115 | 1115 |
| Water content, ppm | 438 | 3397 |
| Catalyst | | |
| 99% NaOH, g | 17.5 | 17.5 |
| Ethanol, g | 150 | 150 |
| Rapeseed flake, g | 1000 | 1000 |
| Water, % | 1.05 | 1.17 |
| Fat content, % DM | 48.9 | 48.9 |
| Acidity, mg KOH/g | 0.9 | 0.9 |

TABLE 9-continued

Influence of water content in the ethanol

| Parameters | F14 | F15 |
|---|---|---|
| Method | 3B Roll spacing 0.05 mm Drying 80° C. | 3B Roll spacing 0.05 mm Drying 80° C. |
| Ethanol/seed ratio | 1.3 | 1.3 |
| Fat concentration in L0, % | 27.3 | 27.2 |
| L0 triglycerides | 0 | 0 |
| S0 triglycerides | 0.88 | 1.1 |

The water content of the ethanol can be about 3000 ppm for the reaction.

3.4) Definition of Treatment Conditions for the Products after Reaction 3.4.1) Liquid-Solid Extraction after Reaction Operating Mode:

Two tests were conducted under the same reaction conditions:

Impregnation of the flattened, dried seeds with ethanol at 50° C. for 30 min (Ethanol/Seed=115/100 weight ratio);

Transesterification at 50° C. for 1 h with the weight ratios <<NaOH/Ethanol/flattened dried seed=1.5/130/100>> (discontinuous mode—1 kg flattened dried seed);

Filtering of the reaction mixture through filter paper of 11-micron pore size under 0.5 bar $N_2$.

The oilseed cakes derived from the first filtration underwent 4 co-current extractions with ethanol having different water contents.

TABLE 10

Influence of water content of the ethanol on seed-cake extraction

| Parameters | FET2 | FET4 |
|---|---|---|
| Pre-impregnation | | |
| T, ° C. | 50 | 50 |
| Time, min. | 30 | 30 |
| Reaction | | |
| Temperature ° C. | 50 | 50 |
| Time, h | 1 | 1 |
| Reaction ethanol, g | 1150 | 1150 |
| Water content, ppm | 3464 | 3550 |
| Catalyst | | |
| 99% NaOH, g | 15.2 | 15.2 |
| Ethanol, g | 150 | 150 |
| Rapeseed flake, g | 1000 | 1000 |
| Flake size, mm | 0.04 | 0.05 |
| Water, % | 2.11 | 1.75 |
| Fat content[1], % DM | 48 | 48.7 |
| AN of fat, mg KOH/g | 0.9 | 0.8 |
| Seed preparation method | Method 3b (Two flattenings) Flattener: HENRY Roll type: smooth Roll spacing: 1$^{st}$ flattening: 0.4 mm 2$^{nd}$ flattening: 0.04 mm Drying T: 80° C. Drying time: 5 h15 | Method 2 Flattener: DAMMAN-CROES Roll type: smooth Roll spacing 0.05 mm DryingT: 90° C. Drying time: (16 to 20 h) |
| Ethanol/seed ratio | 1.3 | 1.3 |
| N° of seed-cake extractions | 4 | 4 |
| Stirring time, min | 30 | 30 |
| T, ° C. | 50 | 50 |

TABLE 10-continued

Influence of water content of the ethanol on seed-cake extraction

| Parameters | FET2 | FET4 |
|---|---|---|
| Purity of extraction ethanol, % | 97 | 99.7 |
| Final seed-cake | | |
| Volatile matter content, % | 60.0 | 58.5 |
| Fat after reaction[1], % DM | 5.9 | 4.7 |
| of which: | | |
| Ethyl esters, % | 0.64 | 94.1 |
| Triglycerides, % | 98.7 | 4.9 |

[1]Determined as per standard V03-908

The lower the water content of the ethanol, the better the seed-cake extraction. Absolute ethanol appears to be the best solvent for extraction with the flattened seeds.

3.4.2) Definition of the Treatment Conditions for the Liquid Phase

Operating Mode:

The liquid derived from transesterification was prepared under the following conditions:

Seed prepared according to method 3a (two flattenings: 1$^{st}$ roll distance: 0.4 mm, second distance: 0.04 mm)

Seed drying at 80° C. for 5 h15 for a volatile matter content of 1.30

Impregnation of the flattened dried seeds with ethanol at 50° C. for 30 min (Ethanol/Seed=115/100 weight ratio)

Transesterification at 50° C. for 2 h with weight ratios <<NaOH/Ethanol/flattened dried Seed=1.5/130/100>> (discontinuous schedule for 4 kg of flattened dried seeds)

Filtering the reaction mixture through filter paper of 11-micron pore size under 0.5 bar $N_2$ to obtain the mother liquor, said L0.

The liquid phase (L0) was neutralized with a solution of sulphuric acid at different concentrations in 97% ethanol.

Table 11 shows that the esters obtained without neutralization have the lowest acid number. On the other hand, the quantity of collected esters is also the lowest. Partial neutralization allows more esters to be obtained. We can neutralize the liquid phase with a 10% sulphuric acid solution.

Table 11a: Preparation conditions for the liquid L0

| Parameters | FET1 |
|---|---|
| Pre-impregnation | |
| T, ° C. | 50 |
| Time min. | 30 |
| Reaction | |
| T, ° C. | 50 |
| Time, h | 2 |
| Reaction ethanol, g | 4600 |
| Water content, ppm | 3345 |
| Catalyst | |
| 99% NaOH, g | 60.8 |
| Ethanol, g | 600 |
| Rapeseed flake, g | 4000 |
| Flake size, mm | 0.04 |
| Water, % | 1.35 |
| Fat content[1], % DM | 48.9 |
| Acid number of fat, mg KOH/g | 0.9 |

-continued

| <<Ethanol/Seed>> ratio | 1.3 |

Table 11b: Influence of the concentration of sulphuric acid on neutralization of the liquid L0

| Parameters | N2 | N1bis | N2bis | N3 | N4 |
|---|---|---|---|---|---|
| NEUTRALIZATION (50° C. for 20 min) | Rotavap | Rotavap (1) | Rotavap (1) | Rotavap (1) | Rotavap (1) |
| L0, g | 501.5 | 250.0 | 250.0 | 250.0 | 250.0 |
| pH | 9.90 (20° C.) | Idem | Idem | Idem | Idem |
| Fat[1], % | 27.6 | 27.6 | 27.6 | 27.6 | 27.6 |
| Equivalent basicity, mmol | 1.23 | 1.23 | 1.23 | 1.23 | 1.23 |
| Theoretical conc of $H_2SO_4$ % | 2.5 | 0 | 2.5 | 5 | 10 |
| Real conc of $H_2SO_4$, % | 2.38 | 0 | 2.38 | 4.80 | 9.55 |
| Equivalent acidity | — | | | | |
| Quantity of acid solution, g | 2.54 | — | 1.27 | 0.63 | 0.32 |
| initial pH | 9.43 | — | 9.93 | | (9.32) |
| end pH | 9.53 | — | 9.63 | 9.90 | 9.82 |
| EVAPORATION | Rotavap | Rotavap | Rotavap | Rotavap | Rotavap |
| T, ° C. | 80 | 80 | 80 | 80 | 80 |
| Pressure, mbar | 20 (1 h 30) | 23 (20 min) | 28 (30 min) | 21 (30 min) | 21 (30 min) |
| Collected ethanol, g | 333.3 | 167.7 | 168.6 | 167.9 | 166.1 |
| DECANTING | Flask | Centrifuging | Flask | Flask | Flask |
| T, ° C. | Ambient | Ambient | Ambient | Ambient | Ambient |
| Time, min | 5 | 5 (4500 rpm) | 5 | 5 | 5 |
| Glycerine, g | 28.5 | 13.3 | 11.9 | 16.2 | 15.9 |
| RMC (95° C.) glycerine, % | 4.04 | 20.11 | 8.44 | 8.22 | 3.64 |
| Crude esters, g | 132.3 | 66.1 | 66.7 | 66.2 | 67.6 |
| RMC (95° C.) crude esters, % | 1.56 | 1.68 | 0.44 | 1.50 | 2.34 |
| WASHING | Flask | Centrifuging | Flask (3) | Flask (3) | Flask (3) |
| Ester weight for washing, g | 124.8 | 58.0 | 60.7 | 60.2 | 61.6 |
| T, ° C. | 90 | Ambient | Ambient | Ambient | Ambient |
| Stirring | Manual | Manual | Manual | Manual | Manual |
| Decanting, min | 15 | 5 (4500 rpm) | Slow | Fast | Fast |
| Number of washings | 4 | 3 | 6 | 6 | 4 |
| Demineralized water/washing, g | about 25 | about 11.6 | about 12.2 | about 12.0 | about 12.3 |
| DRYING | Rotavap | Rotavap | Rotavap | Rotavap | Rotavap |
| T, ° C. | 80 | 80 | 80 | 80 | 80 |
| Pressure, mbar | 26 | 20 | 27 | 26 | 20 |
| Time, min | 30 | 20 | 30-40 | 30 | 30-40 |
| Final esters, g | 121.8 | 55.6 | 59.3 (6) | 59.5 (6) | 60.7 (6) |
| Acid number, mg of KOH/g | 0.48 | 0.27 | 0.48 | 0.45 (7) | 0.46 |

[1]Determined as per standard V03-908

4) Analysis of the Esters on the Basis of European Criteria

Ethyl esters of rapeseed oil were produced from 20 kg of whole seeds. The implementation conditions for the method in discontinuous mode (closed reactor) are the following:
pre-heating temperature before flattening: 50° C.
flattening on roll flattener: roll spacing of 0.2 mm
drying temperature/time of the flattened seeds: 70° C./12 hours
residual moisture of the flattened seeds after drying: 1.9%
weight ratio alcohol/seeds/catalyst (NaOH): 160/100/1.7%
reaction phase temperature and time: 50° C./30 minutes
washing of seedcake with fresh ethanol: 3 times 100 g ethanol
Purification of ethyl esters:
vacuum distillation of ethanol (20 mbar) at 90° C. for 30 minutes
decanting and separation of the glycerine
washing the esters with 4 times 1500 g distilled water
vacuum drying of the ethyl esters (20 mbar) at 110° C. for 30 minutes The weight of the collected ethyl esters is 7600 g, i.e. an ethyl ester yield of 82%.

The esters thus prepared are analyzed on the basis of the chief criteria of European standard NF EN 14214 applicable to methyl esters intended for fuel applications. The results obtained show that the ethyl esters produced have high purity (>97%) free of contaminants and other sub-products below standard limits (total glycerol, water, ethanol, phosphorus, free fatty acids, mono- di- and triglycerides). They also have a ketane number well above standard specifications (>51), all these results confirming that these ethyl esters can be used as fuels.

TABLE 12

Analysis of the composition of the esters obtained from rapeseeds using the method of the invention

| Ester characteristics | Unit | Min | Max | Method | Ethyl esters produced |
|---|---|---|---|---|---|
| Ester content | % (m/m) | 96.5 | | EN 14103 | 97.7 |
| Monoglyceride content | % (m/m) | | 0.80 | EN 14105 | 0.56 |
| Diglyceride cobtent | % (m/m) | | 0.20 | EN 14105 | 0.09 |
| Triglyceride content | % (m/m) | | 0.20 | EN 14105 | 0.11 |
| Free glycerol | % (m/m) | | 0.02 | EN 14105 EN 14106 | <0.01 |
| Total glycerol | % (m/m) | | 0.25 | EN 14105 | 0.17 |
| Mass density at 15° C. | Kg/m3 | 860 | 900 | EN ISO 3675 EN ISO 12185 | 870 |

TABLE 12-continued

Analysis of the composition of the esters
obtained from rapeseeds using the method of the invention

| Ester characteristics | Unit | Min | Max | Method | Ethyl esters produced |
|---|---|---|---|---|---|
| Viscosity at 40° C. | mm2/s | 3.50 | 5.00 | EN ISO 3104 | 4.73 |
| Ketane number | | 51.0 | | EN ISO 10370 | 55 |
| Water content | mg/kg | | 500 | EN ISO 12937 | 108 |
| Acid number | mg KOH/g | | 0.50 | EN 14104 | 0.21 |
| Iodine number | g iodine/100 g | | 120 | EN 14111 | 110.1 |
| Methyl ester content of linolenic acid | % (m/m) Absolute | | 12.0 | EN 14103 | 10.2 |
| Ethanol content | % (m/m) | | 0.2 | | <0.01 |
| Phosphorus content | mg/kg | | 10.0 | EN 14107 | <10 |

The invention claimed is:

1. Method to prepare fatty acid esters from whole oilseeds, comprising the following successive steps:
   a. pre-heating whole, non-dried, non-hulled seeds of rape, groundnut, jatropha, castor bean, sesame, olive, sunflower, safflower, soybean, lupin, camelina, cotton, or rice at a temperature of 50° C. for 30 to 60 min;
   b. flattening the pre-heated, non-dried seeds with their hull;
   c. drying the flattened seeds at a temperature of between 50 and 100° C. to obtain a water and volatile matter content of between 0.5 and 2.5%, wherein the drying step c) is conducted no later than 24 hours after flattening step b); followed by in discontinuous mode, pre-impregnation with absolute ethanol for 10 to 30 minutes at 40 to 80° C.;
   d. transesterification by contacting the flattened, dried seeds from step c) with absolute ethanol in the presence of a catalyst;
   e. separation of liquid and solid phases resulting from transesterification;
   f. neutralizing the liquid phase derived from step e); and
   g. removing the ethanol, and glycerine from the neutralized liquid phase to obtain fatty acid esters.

2. Method according to claim 1, wherein the thickness of the flattened seeds lies between 10 μm and 1 mm.

3. Method according to claim 1, wherein the size of the flattened seeds is between 3 and 5 mm.

4. Method according to claim 1, wherein the drying step c) is conducted no later than 2 hours after flattening step b).

5. Method according to claim 1, wherein the drying step c) is conducted at a temperature of between 70 and 90° C.

6. Method according to claim 1, wherein flattening of the oilseeds is conducted using rolls distanced less than 0.2 mm apart.

7. Method according to claim 1, wherein flattening of the oilseeds is achieved using smooth rollers, in a single pass.

8. Method according to claim 1, wherein the catalyst at the transesterification step d) is a basic catalyst chosen from among sodium hydroxide, potash, sodium or potassium carbonate or hydrogen carbonate, sodium or potassium carbonate, sodium methylate or sodium or potassium ethanolate.

9. Method according to claim 1, wherein the contacting occurs for a time of 10 to 120 minutes at a temperature of between 40 and 60° C.

10. Method according to claim 1, wherein the weight ratio of catalyst/flattened seeds at the transesterification step c) lies between 0.5/100 and 2/100, and the weight ratio of alcohol/flattened seeds at transesterification step d) lies between 100/100 and 500/100.

11. Method according to claim 1, wherein, in discontinuous mode, the transesterification reaction is conducted at a temperature of between 45 and 55° C., for a time ranging from 10 min to 2 hours.

12. Method according to claim 1, wherein the contacting of the flattened seeds with the alcohol medium at transesterification step d) is conducted under slow stirring or by sprinkling and percolation.

13. Method according to claim 1, wherein in addition, the following steps are conducted:
   h. extraction of the ethanol from said solid phase derived from step e);
   i. optional collection of the solid phase from step h);
   j. filtering and grouping together liquid phases derived from step e) and h).

14. Method according to claim 13, wherein the extraction step h) is conducted by percolation.

15. Method according to claim 13, wherein the alcohol used at extraction step h) is chosen from among the C1-C6 alcohols.

16. Method according to claim 15, wherein the alcohol is ethanol containing a quantity of water of less than 5000 ppm.

17. Method according to claim 1, wherein the neutralization step f) is conducted using an acid chosen from among sulphuric acid, hydrochloric acid, phosphoric acid, citric acid or acetic acid.

18. Method according to claim 17, wherein the acid at neutralization step f) is added in a quantity leading to a pH of about 10.

19. Method according to claim 17, wherein the acid at neutralization step f) is added to the liquid phase derived from step e) or i) in a quantity of less than 0.04% of the total quantity of the fatty acid esters present in said liquid phase.

20. Method according to claim 1, wherein step g) to remove the alcohol is conducted by evaporation at a temperature of between 50 and 100° C., under a pressure of between 200 and 1000 mbars, until a residual alcohol content of less than 1% is obtained.

21. Method according to claim 1, wherein the separation of the glycerine from the fatty acid esters at step g) is conducted by centrifuging at a temperature of between 60 and 80° C.

22. Method according to claim 1, wherein after step g), the fatty acid esters are washed in water, separated from the washing water by decanting or centrifuging, then dried at a temperature of between 90 and 100° C. under a pressure in the order of 200 mbars, until a residual water content of less than 500 ppm is obtained relative to total dried matter.

23. Method to prepare oilseed cake intended for animal feed from the solid phase derived from step e) or i) of the method according to claim 13, comprising the following steps:
   1) removing the ethanol from said solid phase; and
   2) adding the glycerine obtained at step g) to the solid phase to provide the oilseed cake.

24. Method to prepare oilseed cake according to claim 23 wherein the removal of the ethanol from said solid phase is conducted mechanically, then thermally by entraining with water vapor until a residual water content of less than 500 ppm is obtained relative to total dried matter.

* * * * *